United States Patent

Nakatsugawa

[11] Patent Number: 6,094,460
[45] Date of Patent: Jul. 25, 2000

[54] DATA MODULATOR AND DATA MODULATING METHOD

[75] Inventor: Yoshinori Nakatsugawa, Shizuoka-ken, Japan

[73] Assignee: Yazaki Corporation, Tokyo, Japan

[21] Appl. No.: 09/012,236

[22] Filed: Jan. 23, 1998

[30] Foreign Application Priority Data

Jan. 27, 1997 [JP] Japan .................................. 9-012843

[51] Int. Cl.⁷ ................................................. H04L 27/04
[52] U.S. Cl. ....................... 375/295; 375/354; 342/185; 370/498
[58] Field of Search ...................... 375/253, 295, 375/354; 370/537, 545, 498, 503; 380/204, 213, 215, 218; 369/50, 59; 386/124; 342/185

[56] References Cited

U.S. PATENT DOCUMENTS

| | | | |
|---|---|---|---|
| Re. 35,078 | 10/1995 | Ryan | 380/218 |
| 4,063,038 | 12/1977 | Kaul et al. | 370/545 |
| 4,575,754 | 3/1986 | Bar-Zar | 380/215 |
| 4,594,609 | 6/1986 | Romao | 380/218 |
| 4,891,808 | 1/1990 | Williams | 370/503 |
| 4,901,349 | 2/1990 | Metger | 380/213 |
| 5,003,592 | 3/1991 | Pires | 380/213 |
| 5,289,322 | 2/1994 | Higashida | 380/124 |
| 5,345,449 | 9/1994 | Buckingham et al. | 370/518 |
| 5,438,620 | 8/1995 | Ryan | 380/218 |
| 5,579,390 | 11/1996 | Ryan | 380/218 |
| 5,581,307 | 12/1996 | Ryan | 348/630 |
| 5,583,936 | 12/1996 | Wonfor | 380/204 |
| 5,608,799 | 3/1997 | Ryan | 380/213 |
| 5,633,927 | 5/1997 | Ryan | 380/204 |
| 5,694,383 | 12/1997 | Arataki et al. | 369/59 |
| 5,825,899 | 10/1998 | Yamaguchi et al. | 381/94.4 |
| 5,841,863 | 11/1998 | Ryan | 380/218 |
| 5,844,988 | 12/1998 | Ryan | 380/218 |
| 5,854,938 | 12/1998 | Ogi | 395/800.3 |
| 5,917,857 | 6/1999 | Tanaka et al. | 375/253 |
| 5,956,307 | 9/1999 | Koudo et al. | 369/50 |

FOREIGN PATENT DOCUMENTS

| | | |
|---|---|---|
| 59-221813 | 12/1984 | Japan . |
| 64-60174 | 3/1989 | Japan . |
| 4-326270 | 11/1992 | Japan . |
| 5-64111 | 3/1993 | Japan . |
| 62-125786 | 6/1997 | Japan . |

OTHER PUBLICATIONS

CD–ROM Drives—A Buyer's Guide by Nancy K. Herther.
CD–ROM Drive Unit CDR–36, CDR–83, Nosaka et al.
CD–ROM Drive Unit CDR–72, CDR–82, Nosaka et al.
European Search Report dated Oct. 8, 1999.

*Primary Examiner*—Stephen Chin
*Assistant Examiner*—Chieh M. Fan
*Attorney, Agent, or Firm*—Finnegan, Henderson, Farabow, Garrett & Dunner, L.L.P.

[57] ABSTRACT

In a plurality of shift registers which receive M·n-tuple speed data divided into plural parts, execute modulation of the data, and output modulated data as n-tuple speed data, a period of time required from a start of inputting M·n-tuple speed divided data as a modulation object to an end of outputting n-tuple speed modulated data is set within one period of an M·n-tuple speed frame clock.

4 Claims, 3 Drawing Sheets

DATA MODULATOR AND DATA MODULATING METHOD

BACKGROUND OF THE INVENTION

1. Field of the Invention

The present invention relates to a data modulator and a data modulating method capable of modulating M·n-tuple speed data (where M and n are positive integers and $M \geq 2$) such as sound, image, etc. in the digital form, which are input from an information supply source such as a CD-ROM drive, into n-tuple speed data in real time and then outputting n-tuple speed modulated data.

2. Description of the Prior Art

In recent years, various information reproducing devices for reproducing digital data such as sound, image, etc. stored in an information storing medium such as CD (Compact Disc), CD-ROM, etc. have been rapidly spread.

In particular, for example, in a CD-ROM drive which can play the digital data stored in the CD-ROM, a higher data transfer speed is pushed forward in answer to the request to play smoothly multimedia soft such as music, moving picture, etc. This higher data transfer speed can be achieved as an integral multiple of a standard speed of 1.50 Kbyte/sec which is a data transfer speed of a music CD player.

In the above situation that such higher data transfer speed is pushed forward day after day, there have been on the market various CD-ROM drives which can play the digital data in mutually different tuple speed modes such as double speed, treble speed, quadruple speed, sextuple speed, octuple speed, nonuple speed, etc. according to plural standards respectively.

However, in the above situation that the CD-ROM drives which are operated in mutually different tuple speed modes according to plural standards have been brought to the market, there has been a to-be-overcome drawback, for example, that there is a possibility of bringing about such a situation that the digital data which are reproduced at a tuple speed mode, e.g., double speed, treble speed, quadruple speed, octuple speed, etc. peculiar to a certain CD-ROM drive and then transmitted therefrom at a predetermined transfer speed cannot be received by an image reproducing unit on the receiver side.

The above situation has occurred in the event that the data transfer speed on the receiver side does not coincide with the data transfer speed on the transmitter side. In order not to bring about such situation, there has been such a disadvantage for the user of the CD-ROM drive in expanding the user's system that not only the user has to prepare another receiver side device which is able to receive the digital data at the transfer speed corresponding to the tuple speed mode of his or her own CD-ROM drive, but also the user has to newly introduce another transmitter side device with a different tuple speed mode into the user's system after an image reproducing system has been constructed by combining the CD-ROM drive as the transmitter side device with the image reproducing unit as the receiver side device, for instance.

SUMMARY OF THE INVENTION

The present invention has been made in light of the above circumstances, and it is an object of the present invention to provide a data modulator and a data modulating method which are capable of executing modulation process of plural M·n-tuple speed divided data stored in plural shift registers respectively without overflow of data and then outputting n-tuple speed modulated data sequentially even if M·n-tuple speed data are divided and then input into the plural shift registers sequentially, by setting, within one period of an M·n-tuple speed frame clock, a period of time which is needed from inputting of the plural M·n-tuple speed divided data as modulation objects into the plural shift registers to outputting of n-tuple speed modulated data.

In order to achieve the above object, according to a first aspect of the present invention, there is provided a data modulator comprising: an input port for inputting M·n-tuple speed data (where M and n are positive integers and $M \geq 2$), which are send out in a digital form from an information supply source sequentially, in synchronism with an M·n-tuple speed sampling clock; a plurality of shift registers for dividing the M·n-tuple speed data input via the input port into plural data in synchronism with a plurality of first timing clocks, which are set previously to distribute an M·n-tuple speed sampling clock as plural sampling clocks not to overlap mutually on a time base and not to generate a free time space within a predetermined period of an M·n-tuple speed frame clock, and in synchronism with the M·n-tuple speed sampling clock to input M·n-tuple speed divided data, and then storing M·n-tuple speed divided data therein respectively, and for modulating the M·n-tuple speed data previously stored respectively into n-tuple speed data in synchronism with a plurality of second timing clocks, which are set previously to distribute an n-tuple speed sampling clock as plural sampling clocks not to overlap mutually on a time base and not to generate a free time space, and in synchronism with an n-tuple speed sampling clock and then outputting the n-tuple speed data respectively; and output ports for outputting respectively the n-tuple speed data which are output from the plurality of shift registers respectively; wherein a period of time required from a start of inputting the M·n-tuple speed data to an end of outputting n-tuple speed modulated data is set within one period of the M·n-tuple speed frame clock in the plurality of shift registers respectively.

According to the present invention, the plurality of shift registers can divide the M·n-tuple speed data input via the input port into plural data in synchronism with the plurality of first timing clocks, which are set previously to distribute the M·n-tuple speed sampling clock as plural sampling clocks not to overlap mutually on the time base and not to generate the free time space within the predetermined period of the M·n-tuple speed frame clock, and in synchronism with the M·n-tuple speed sampling clock to input the M·n-tuple speed divided data, and then store the input M·n-tuple speed divided data therein respectively, and can also modulate the M·n-tuple speed data previously stored respectively into n-tuple speed data in synchronism with the plurality of second timing clocks, which are set previously to distribute the n-tuple speed sampling clock as plural sampling clocks not to overlap mutually on the time base and not to generate the free time space, and in synchronism with the n-tuple speed sampling clock and then output the n-tuple speed data respectively. The period of time required from the start of inputting the M·n-tuple speed data to the end of outputting modulated n-tuple speed data is set within one period of the M·n-tuple speed frame clock in the plurality of the shift registers. Therefore, even if the M·n-tuple speed data are divided and then input sequentially into the plurality of shift registers, the modulation process can be applied to stored data in the plurality of shift registers without overflow of data, and then n-tuple speed modulated data can be sequentially output. As a result, the modulation process of data can be achieved in real time with a simple circuit configuration and without a large capacity buffer memory.

In the preferred embodiment of the present invention, a data modulator further comprises logical sum circuits for executing logical sum operations of the plurality of n-tuple speed data which are output from the plurality of shift registers respectively, and then outputting the results of calculation via the output ports.

According to the embodiment, the logical sum circuit can execute logical sum operations of the plurality of n-tuple speed data which are output from the plurality of shift registers via the output ports respectively, and then output the results of calculation.

In order to achieve the above object, according to a second aspect of the present invention, there is provided a data modulating method of modulating M·n-tuple speed data (where M and n are integers and M≧2) which are send out in a digital form from an information supply source sequentially into n-tuple speed data, the method comprising the steps of: dividing the M·n-tuple speed data sent out from the information supply source sequentially into plural data in synchronism with a plurality of first timing clocks, which are set previously to distribute an M·n-tuple speed sampling clock as plural sampling clocks not to overlap mutually on a time base and not to generate a free time space within a predetermined period of an M·n-tuple speed frame clock, and in synchronism with the M·n-tuple speed sampling clock to input M·n-tuple speed divided data, and then storing input M·n-tuple speed divided data therein respectively, and for modulating the M·n-tuple speed data previously stored respectively into n-tuple speed data in synchronism with a plurality of second timing clocks, which are set previously to distribute an n-tuple speed sampling clock as plural sampling clocks not to overlap mutually on a time base and not to generate a free time space, and in synchronism with an n-tuple speed sampling clock and then outputting the n-tuple speed data respectively; and setting a period of time required from a start of inputting the M·n-tuple speed data to an end of outputting n-tuple speed modulated data within one period of the M·n-tuple speed frame clock respectively.

According to the present invention, the plurality of shift registers can divide the M·n-tuple speed data input via the input port into plural data in synchronism with the plurality of first timing clocks which are set previously to distribute the M·n-tuple speed sampling clock as plural sampling clocks not to overlap mutually on the time base and not to generate the free time space within the predetermined period of the M·n-tuple speed frame clock and in synchronism with the M·n-tuple speed sampling clock, then input the divided M·n-tuple speed data, and then store the input M·n-tuple speed divided data therein respectively, and can also modulate the M·n-tuple speed data previously stored respectively into n-tuple speed data in synchronism with the plurality of second timing clocks which are set previously to distribute the n-tuple speed sampling clock as plural sampling clocks not to overlap mutually on the time base and not to generate the free time space and in synchronism with the n-tuple speed sampling clock and then output the n-tuple speed data respectively. The period of time required from the start of inputting the M·n-tuple speed data to the end of outputting n-tuple speed modulated data is set within one period of the M·n-tuple speed frame clock in the plurality of the shift registers. Therefore, even if the M·n-tuple speed data are divided and then input sequentially into the plurality of shift registers, the modulation process can be applied to stored data in the plurality of shift registers without overflow of data, and then n-tuple speed modulated data can be sequentially output. As a result, the modulation process of data can be achieved in real time with a simple circuit configuration and without a large capacity buffer memory.

In the preferred embodiment of the present invention, logical sum operations of the plurality of n-tuple speed data which have been subject to modulation are executed, and then the results of calculation are output.

The nature, principle and utility of the invention will become more apparent from the following detailed description when read in conjunction with the accompanying drawings.

DESCRIPTION OF THE PREFERRED EMBODIMENT

A data modulator and a data modulating method according to an embodiment of the present invention will be explained in detail with reference to accompanying drawings hereinbelow.

Figure 1:
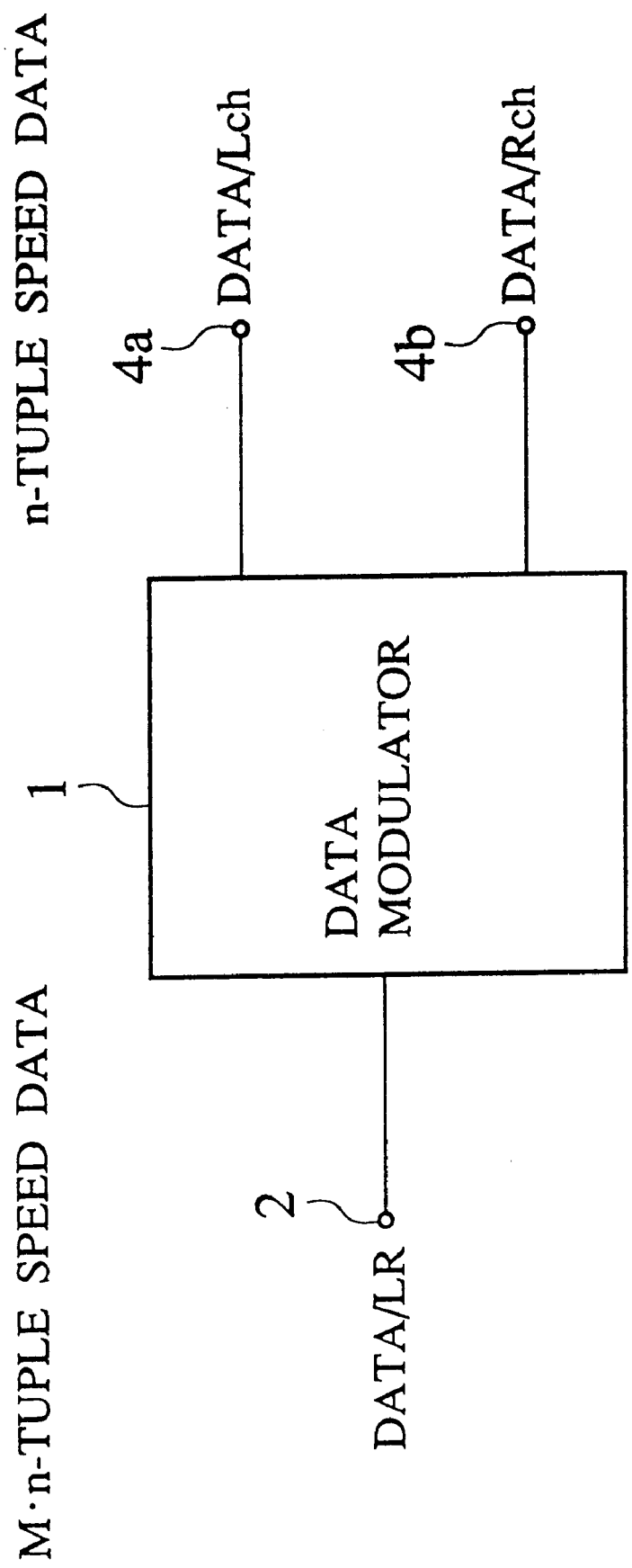
FIG. 1 is a schematic block circuit diagram showing a configuration of a data modulator according to the present invention.

As shown in FIG. 1, a data modulator 1 according to the present invention has one input port 2 for inputting M·n-tuple speed data (where M and n are integers and M≧2) DATA/LR which include a stereo signal having two left/right (LR) channel configuration alternatively, and a pair of first and second output ports 4a, 4b for outputting n-tuple speed data DATA/Lch, DATA/Rch through two left/right channels respectively. The data modulator 1 has functions for separating, for example, double speed data DATA/LR having two left/right channel configuration, which are sent out from a double speed CD-ROM drive sequentially, into two left/right channels respectively and then modulating such separated double speed data into two-system standard speed data DATA/Lch, DATA/Rch in real time.

The standard speed data which have been subject to modulation by the data modulator 1 are transmitted to a designated destination via a network constructed by connecting a plurality of terminal apparatuses such as a sound reproducing device, a personal computer, etc. In the event that the standard speed data are transmitted to the sound reproducing device, they can be demodulated into original double speed data by the sound reproducing device, and then such double speed data which have undergone the demodulation can be reproduced in the form of sound in real time.

Next, an internal configuration of the data modulator 1 according to the present invention will be explained in detail with reference to FIG. 2 hereunder. In the present embodiment, taking as an example the case where the double speed data DATA/LR which are sent out from a double speed CD-ROM drive sequentially via a digital audio interface being standardized to constitute one frame of 48 bits by combining two left/right subframes with each other are separated into two left/right channels respectively and then modulated into two-system standard speed data DATA/Lch, DATA/Rch, the internal configuration of the data modulator 1 will be explained hereunder.

Figure 2:
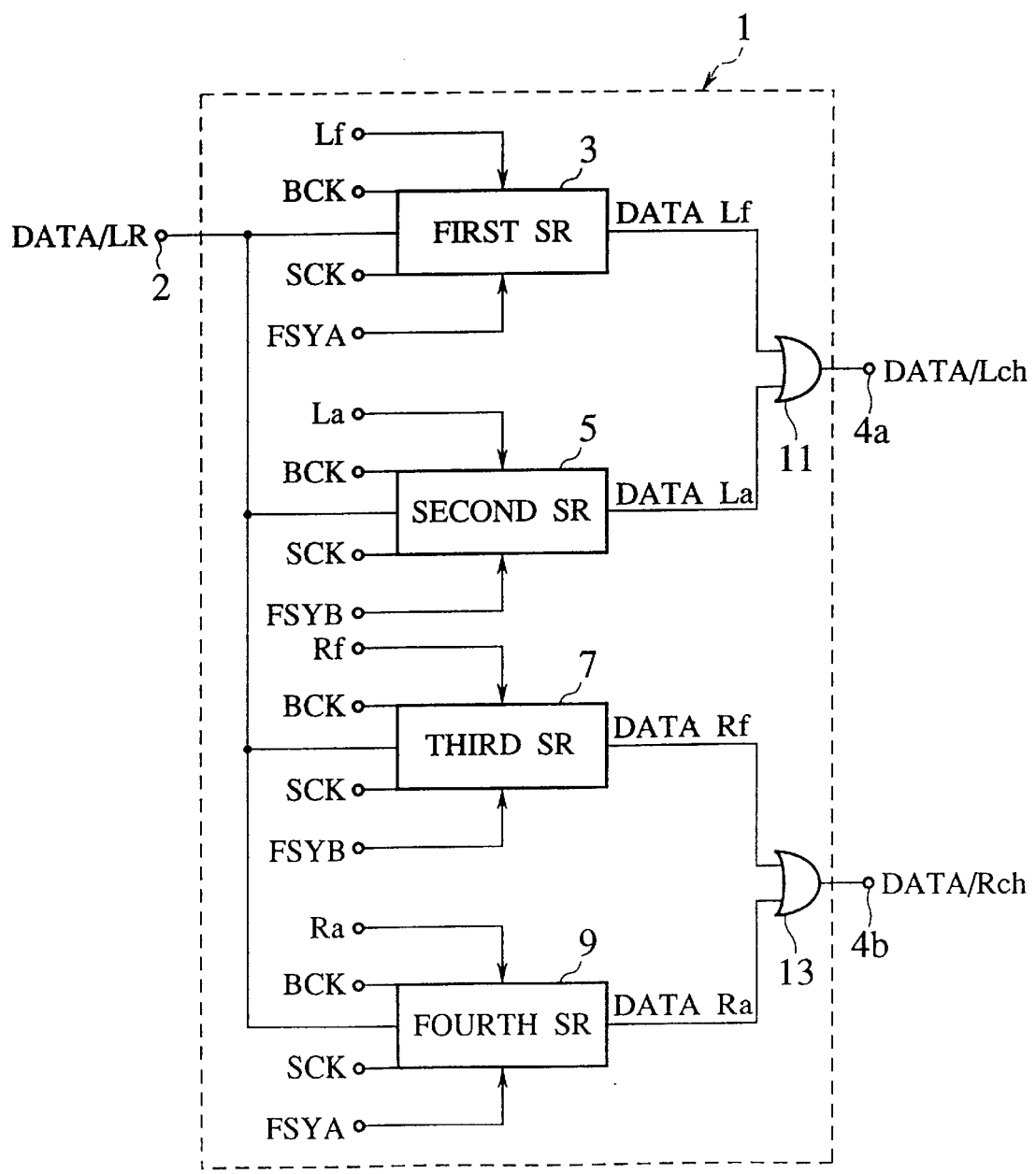
FIG. 2 is a block circuit diagram showing an internal configuration of the data modulator according to the present invention.

As shown in FIG. 2, the data modulator 1 according to the present invention comprises first to fourth shift registers (abbreviated as "SRs" hereinafter) 3, 5, 7, 9 with a 12-bit length, for example, for dividing double speed data DATA/LR of two left/right channels in synchronism with a double speed sampling clock BCK at peculiar timings described later respectively and then inputting the divided double speed data, and for modulating the input divided data into standard speed data DATA/Lf, DATA/La, DATA/Rf, DATA/Ra in synchronism with a standard speed sampling clock SCK at peculiar timings also described later respectively and then outputting modulated standard speed data; a first logical sum circuit 11 for calculating a logical sum (OR) of the standard speed data DATA/Lf, DATA/La which have been output from the first and second SRs 3, 5 respectively, and then outputting the calculated standard speed data DATA/Lch for the left channel; and a second logical sum circuit 13 for calculating a logical sum (OR) of the standard speed data DATA/Rf, DATA/Ra which have been output from the third and fourth SRs 7, 9 respectively, and then outputting the calculated standard speed data DATA/Rch for the right channel.

Figure 3:
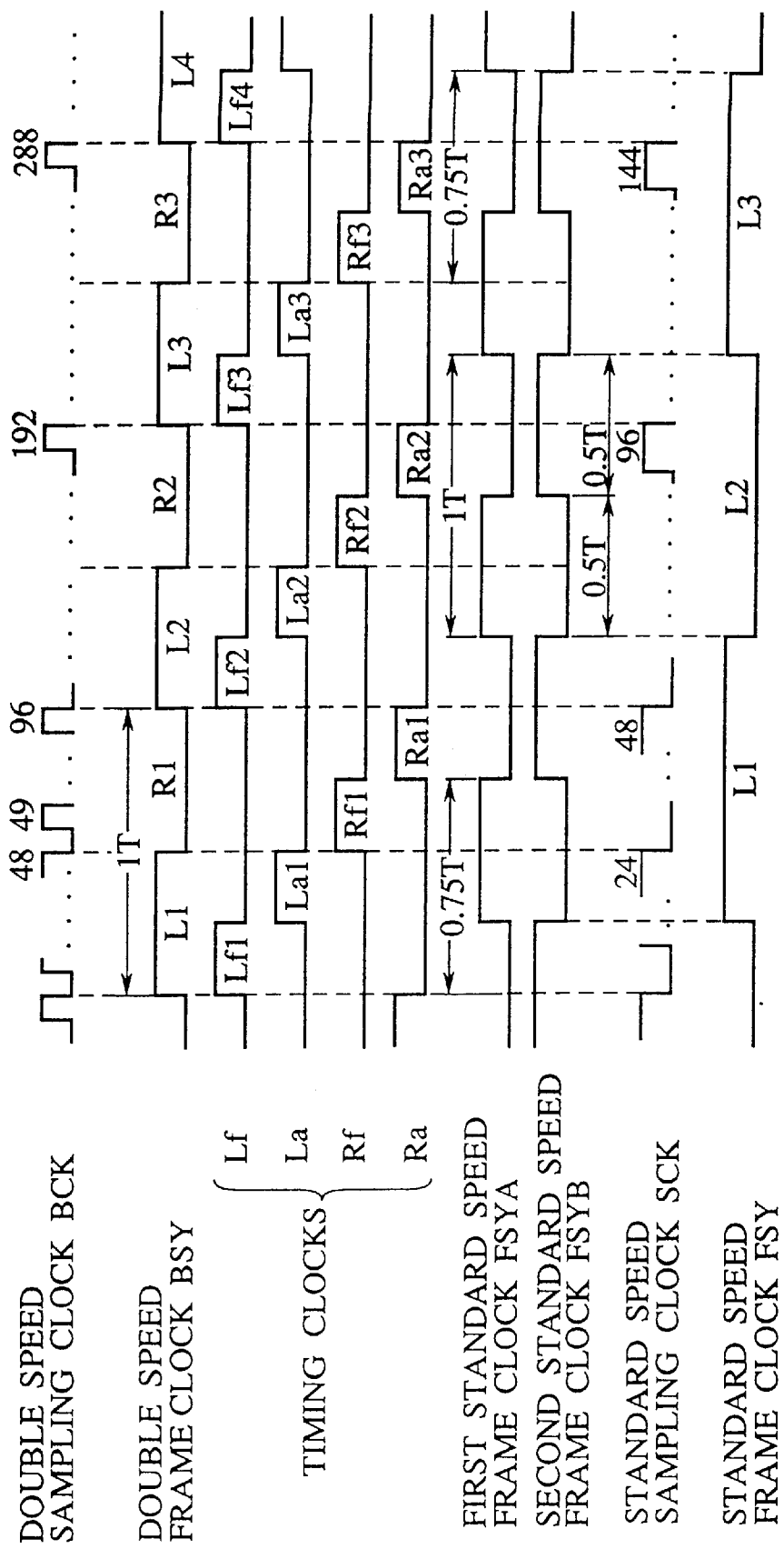
FIG. 3 is a timing chart explaining an operation of the data modulator according to the present invention.

Next, respective peculiar timings used when the first to fourth SRs 3, 5, 7, 9 divide the double speed data DATA/LR and input the divided data respectively will be explained with reference to FIG. 3 hereunder. First, first to fourth timing clocks Lf, La, Rf, Ra are generated by dividing one frame period 1 T of a double speed frame clock BSY into quarters uniformly such that each of the first to fourth timing clocks Lf, La, Rf, Ra rises to a high level in sequence so as to have the same period as one frame period 1 T of the double speed frame clock BSY and also maintain the high level only for a ¼ period of the frame period 1 T respectively, by shifting the double speed frame clock BSY sequentially by the ¼ period within the frame period respectively. An important respect is that the first to fourth timing clocks Lf, La, Rf, Ra should be set previously such that the double speed sampling clock BCK can be distributed into plural clocks not to overlap mutually on a time base and not to generate a free time space within the same one period of the double speed frame clock BSY. The peculiar timings used when the first to fourth SRs 3, 5, 7, 9 divide the double speed data DATA/LR and input the divided data can be set by inputting the first to fourth timing clocks Lf, La, Rf, Ra into the first to fourth SRs 3, 5, 7, 9 respectively. In other words, when all the first to fourth timing clocks Lf, La, Rf, Ra are being held in their high level states, the first to fourth SRs 3, 5, 7, 9 can divide the double speed data DATA/LR in synchronism with the double speed sampling clock BCK and then input the divided data. As a result of this, the double speed data DATA/LR in one frame period of the double speed frame clock BSY can be divided into quarters uniformly on a time base, and the divided double speed data can be input in series into the first to fourth SRs 3, 5, 7, 9 sequentially in synchronism with the double speed sampling clock BCK and then stored therein respectively.

Next, respective peculiar timings used when the first to fourth SRs 3, 5, 7, 9 modulate the divided double speed data stored as above into the standard speed data and then output the modulated standard speed data will be explained with reference to FIG. 3 hereunder. At first, a first standard speed frame clock FSYA, which has the same waveform as the double speed frame clock BSY and is delayed in phase by the ¼ period relative to the double speed frame clock BSY, and a second standard speed frame clock FSYB, which also has the same waveform as the double speed frame clock BSY and is delayed in phase by the ¾ period relative to the double speed frame clock BSY are generated in advance. Then, peculiar timings used when the first to fourth SRs 3, 5, 7, 9 modulate the stored divided data into the standard speed data and then output the modulated data can be set by inputting the first standard speed frame clock FSYA into the first and fourth SRs 3, 9 respectively and inputting the second standard speed frame clock FSYB into the second and third SRs 5, 7 respectively. In other words, when both the first standard speed frame clock FSYA and the second standard speed frame clock FSYB are being held in their high level states respectively, the first and second SRs 3, 5 can modulate the stored divided data into the standard speed data DATA/Lf, DATA/La respectively in synchronism with the standard speed sampling clock SCK, and then output such standard speed data in series. Where the standard speed sampling clock SCK has a frequency obtained by ½ frequency-dividing a clock frequency of the double speed sampling clock BCK. Similarly, when both the first standard speed frame clock FSYA and the second standard speed frame clock FSYB are being held their high level states respectively, the third and fourth SRs 7, 9 can modulate stored divided data into the standard speed data DATA/Rf, DATA/Ra respectively in synchronism with the standard speed sampling clock SCK, and then output such standard speed data in series.

Various sampling clocks, various frame clocks, and various timing clocks used in the above embodiment can be generated by a clock generator (not shown) and are supplied appropriately to respective portions such as a plurality of shift registers.

In turn, an operation of the above data modulator according to the present invention will be explained in detail with reference to FIGS. 2 and 3 hereinbelow.

According to the data modulator 1 according to the present invention, when the first to fourth timing clocks Lf, La, Rf, Ra whose rise timings are set to be shifted by the ¼ period sequentially not to overlap mutually on a time base and not to generate a free time space are being held in their high level states respectively, the first to fourth SRs 3, 5, 7, 9 can divide the double speed data DATA/LR of two left/right channels into quarters in synchronism with the double speed sampling clock BCK and then input the divided data. As a result, the double speed data DATA/LR in one frame period of the double speed frame clock BSY can be divided into quarters uniformly on a time base, and then such divided data can be input in series into the first to fourth SRs 3, 5, 7, 9 in synchronism with the double speed sampling clock BCK respectively and then stored therein respectively.

When the first standard speed frame clock FSYA and the second standard speed frame clock FSYB both being generated previously are being held in their high level states respectively, the first and second SRs 3, 5 can modulate the above stored divided data into the standard speed data DATA/Lf, DATA/La respectively in synchronism with the standard speed sampling clock SCK, and then output such standard speed data to the first logical sum circuit 11 in series. As stated above, the standard speed sampling clock SCK has a frequency obtained by ½ frequency-dividing a clock frequency of the double speed sampling clock BCK. Similarly, when the second standard speed frame clock FSYB and the first standard speed frame clock FSYA both being generated previously are being held in their high level states respectively, the third and fourth SRs 7, 9 can modulate the above stored divided data into the standard speed data DATA/Rf, DATA/Ra respectively in synchronism with the standard speed sampling clock SCK, and then output such standard speed data to the second logical sum circuit 13 in series.

Then, the first logical sum circuit 11 can calculate the logical sum of the standard speed data DATA/Lf, DATA/La which have been output from the first and second SRs 3, 5 respectively, and then output the calculated standard speed data DATA/Lch for the left channel to a first output port 4*a*. The second logical sum circuit 13 can calculate the logical sum of the standard speed data DATA/Rf, DATA/Ra which have been output from the third and fourth SRs 7, 9 respectively, and then output the calculated standard speed data DATA/Rch for the right channel to a second output port 4*b*.

Out of the double speed data DATA/L for the L channel which are input into the data modulator 1 when the double speed frame clock BSY is at its high level, behavior of modulation process with regard to L channel data DATA/L1 shown in FIG. 3 will be explained. Since the modulation process with respect to the double speed data DATA/R for the R channel can be executed similarly according to following procedures, redundant and overlapped explanation will be omitted hereinbelow.

First of all, when timing clocks Lf1, La1 are turned to their high level, the L channel data DATA/L1 can be input in series into the first and second SRs 3, 5 respectively in synchronism with the double speed sampling clock BCK. The double speed L channel data DATA/L1 can then be divided into two data parts uniformly, and then stored into the first and second SRs 3, 5 respectively. When the first standard speed frame clock FSYA is held in its high level state, the divided data stored in the first SR 3 can be modulated into standard speed data DATA/Lf1 in synchronism with the standard speed sampling clock SCK, and then the modulated standard speed data DATA/Lf1 can be output in series to the first logical sum circuit 11. Meanwhile, when the second standard speed frame clock FSYB is held in its high level state, the divided data stored in the second SR 5 can be modulated into standard speed data DATA/La1 in synchronism with the standard speed sampling clock SCK, and then the modulated standard speed data DATA/La1 can be output in series to the first logical sum circuit 11. A logical sum of the standard speed data DATA/Lf1 and DATA/La1 can be calculated by the first logical sum circuit 11, and then data DATA/Lch (L1) shown in FIG. 3 can be output as the result of above calculation in synchronism with the standard speed frame clock FSY. In the first SR 3, a time period required from a start point when the divided data of the double speed L channel data DATA/L1 are input to an end point when the divided data are modulated into the standard speed data DATA/Lf1 and then output can be set to the ¾ period (0.75 T) of the double speed frame clock BSY so as not to exceed one period (1 T) of the double speed frame clock BSY. In the second SR 5, a time period required from a start point when the divided data of the double speed L channel data DATA/L1 are input to an end point when the divided data are modulated into the standard speed data DATA/La1 and then output can be set to one period (1 T) of the double speed frame clock BSY so as not to exceed one period (1 T) of the double speed frame clock BSY. The above is similarly true of the third and fourth SRs 7, 9 which will receive the double speed R channel data DATA/R as the modulation object. In summary, in the first to fourth SRs 3, 5, 7, 9, the time periods required from a start of inputting the double speed data as the modulation object to an end of outputting the standard speed modulated data are set within one period (1 T) of the double speed frame clock BSY. For this reason, even if the double speed data DATA/LR are divided and then input sequentially into the first to fourth SRs 3, 5, 7, 9, the modulation process can be applied to stored data in the first to fourth SRs 3, 5, 7, 9 without overflow of data and then modulated data can be output sequentially to the first logical sum circuit 11 and the second logical sum circuit 13. As a consequence, according to the data modulator 1 according to the present invention, the modulation process of data can be achieved in real time with a simple circuit configuration and without a large capacity buffer memory.

Though has been explained in detail above, the present invention is not limited to the above-described embodiment, but other embodiments of the present invention may be implemented by making appropriate modifications to the above embodiment.

More specifically, in the present embodiment, the case where the double speed data which are sent out from the double speed CD-ROM drive sequentially via the digital audio interface being standardized to constitute one frame of 48 bits by combining two left/right subframes with each other are separated into two left/right channels respectively and then modulated into two-system standard speed data has been explained as the example, but the present invention is not limited to this case. The present invention may be applied to modulate the M·n-tuple speed data (where M and n are integers and M≧2) into the n-tuple speed data, for example, to modulate the treble or quadruple speed data into the n-tuple speed data, by setting the number of the shift register and the data bit length, the number of the timing clocks used when the shift registers input the double data as the modulation object and the duty factor, the number of the timing clocks used when the shift registers output the modulated data and the duty factor, etc. to appropriate values respectively.

In the case where the treble speed data are modulated into the standard speed data, another embodiment which is equipped with one input port for inputting the treble speed data and three output ports for outputting the standard speed data can be preferably employed as a configuration of the data modulator according to the present invention.

In the present embodiment, the double speed data which are sent out via the digital audio interface being standardized to constitute one frame of 48 bits by combining two left/right subframes with each other has been explained as the modulation object, but the present invention is not limited to this example. The double speed data in which the bit number included in one frame is modified to an appropriate value, for example, the double speed data in which one frame is composed of 32 bits or 64 bits, may be selected as the modulation object.

In addition, in the present embodiment, the double speed data which are sent out via the digital audio interface being standardized to constitute one frame by combining two left/right subframes with each other has been explained as the modulation object, but the present invention is not limited to this example. In addition to the above double speed data which are sent out via the digital audio interface being standardized as above, for example, monaural digital data or every kind of digital double data formatted according to every standard may be selected as the modulation object.

To the end, in the present embodiment, the CD-ROM drive has been explained as the double speed data supply source, but the present invention is not limited to this example. It is needless to say that M·n-tuple speed data which are supplied from every device by which higher data transfer speed can be promoted, for example, a DVD (Digital Video Disc) player, a DAT (Digital Audio Taperecorder), etc. may be modulated into the n-tuple speed data.

What is claimed is:

1. A data modulator comprising:

an input port for inputting M·n-tuple speed data (where M and n are positive integers and M≧2), which are sent out in a digital form from an information supply source sequentially, in synchronism with an M·n-tuple speed sampling clock;

a plurality of shift registers for dividing the M·n-tuple speed data input via the input port into plural data in synchronism with a plurality of first timing clocks, which are set previously to distribute an M·n-tuple speed sampling clock as plural sampling clocks not to overlap mutually on a time base and not to generate a free time space within a predetermined period of an M·n-tuple speed frame clock, and in synchronism with the M·n-tuple speed sampling clock to input M·n-tuple speed divided data, and then storing M·n-tuple speed divided data therein respectively, and for modulating the M·n-tuple speed data previously stored respectively into n-tuple speed data in synchronism with a plurality of second timing clocks, which are set previously to distribute an n-tuple speed sampling clock as plural sampling clocks not to overlap mutually on a time base and not to generate a free time space, and in synchronism with the n-tuple speed sampling clock and then outputting the n-tuple speed data respectively; and output ports for outputting respectively the n-tuple speed data which are output from the plurality of shift registers respectively;

wherein a period of time required from a start of inputting the M·n-tuple speed data to an end of outputting n-tuple speed modulated data is set within one period of the M·n-tuple speed frame clock in the plurality of shift registers respectively.

2. A data modulator according to claim 1, further comprising logical sum circuits for executing logical sum operations of the plurality of n-tuple speed data which are output from the plurality of shift registers respectively, and then outputting results of calculation via the output ports.

3. A data modulating method of modulating M·n-tuple speed data (where M and n are positive integers and M≧2) which are sent out in a digital form from an information supply source sequentially into n-tuple speed data, the method comprising the steps of:

dividing the M·n-tuple speed data sent out from the information supply source sequentially into plural data in synchronism with a plurality of first timing clocks, which are set previously to distribute an M·n-tuple speed sampling clock as plural sampling clocks not to overlap mutually on a time base and not to generate a free time space within a predetermined period of an M·n-tuple speed frame clock, and in synchronism with the M·n-tuple speed sampling clock to input M·n-tuple speed divided data, and then storing input M·n-tuple speed divided data therein respectively, and for modulating the M·n-tuple speed data previously stored respectively into n-tuple speed data in synchronism with a plurality of second timing clocks, which are set previously to distribute an n-tuple speed sampling clock as plural sampling clocks not to overlap mutually on a time base and not to generate a free time space, and in synchronism with the n-tuple speed sampling clock and then outputting the n-tuple speed data respectively; and setting a period of time required from a start of inputting the M·n-tuple speed data to an end of outputting n-tuple speed modulated data within one period of the M·n-tuple speed frame clock respectively.

4. A data modulating method according to claim 3, wherein logical sum operations of the plurality of n-tuple speed data which have been subject to modulation are executed, and then results of calculation are output.

* * * * *